UNITED STATES PATENT OFFICE.

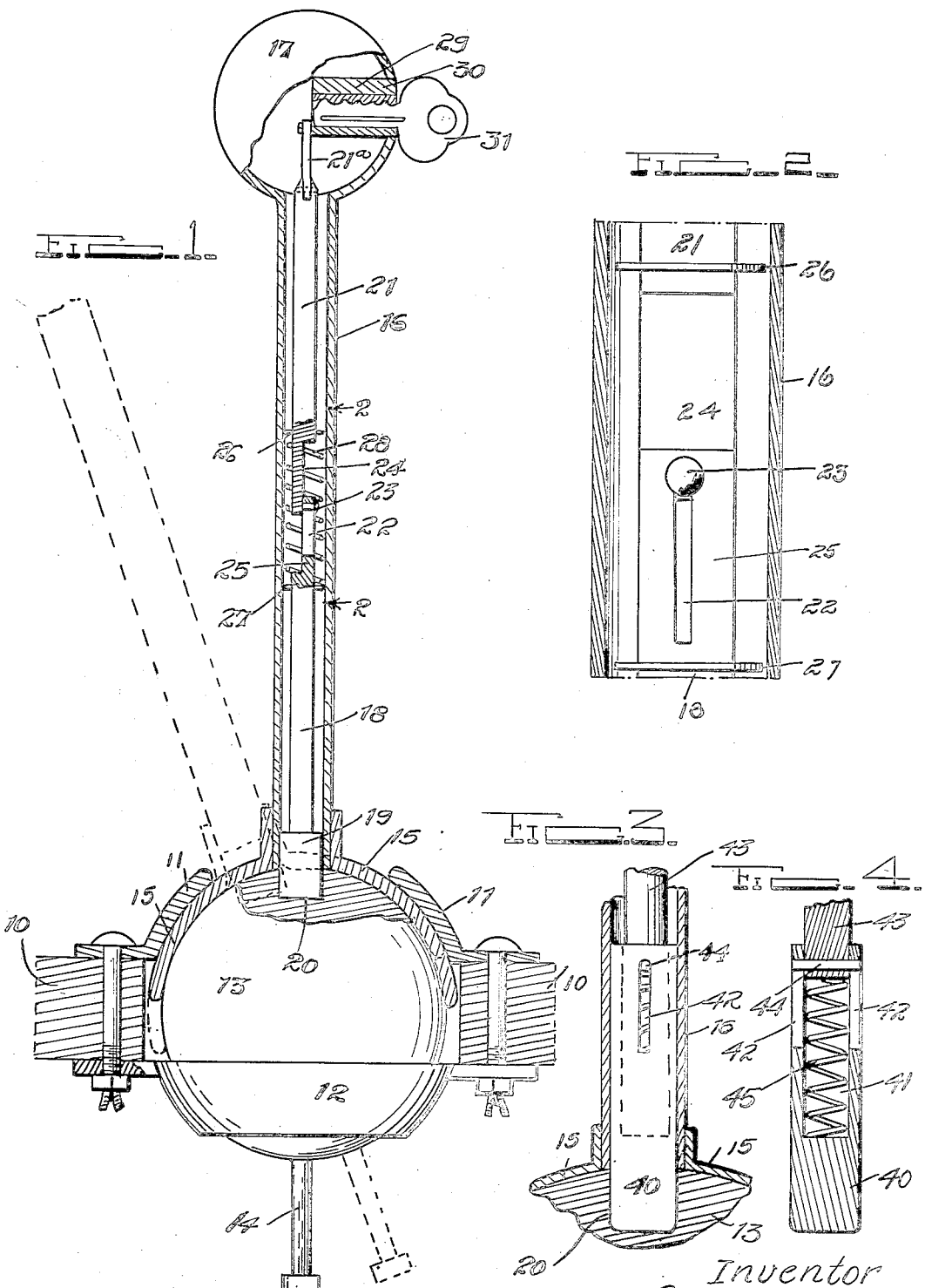

CLAUDE E. MENTZER, OF DES MOINES, IOWA, ASSIGNOR OF THREE-SIXTEENTHS TO HERBERT H. SEARLE, ONE-EIGHTH TO FRED W. MILLER, ONE-EIGHTH TO JOHN F. GRIFFIN, ONE-EIGHTH TO EARL A. LEWIS, AND ONE-EIGHTH TO ARTHUR T. WALLACE, ALL OF DES MOINES, IOWA, AND ONE-EIGHTH TO MAHLON M. HEAD, OF JEFFERSON, IOWA.

LOCK DEVICE FOR GEAR-SHIFT LEVERS.

1,344,554.   Specification of Letters Patent.   Patented June 22, 1920.

Application filed July 8, 1919. Serial No. 309,407.

*To all whom it may concern:*

Be it known that I, CLAUDE E. MENTZER, a citizen of the United States, and a resident of Des Moines, in the county of Polk and State of Iowa, have invented a certain new and useful Lock Device for Gear-Shift Levers.

The object of my invention is to provide a lock device for gear shift levers of simple, durable and inexpensive construction.

More particularly it is my object to provide a gear shift lever construction of the type used with ordinary H slots, for instance, having the parts so constructed and provided with a locking device that the lever proper forming the handle portion thereof may be securely connected with the operative parts of the lever, or disconnected from by means of the operation of a key.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a vertical, sectional view through a lock for gear shift levers embodying my invention.

Fig. 2 shows a detail, sectional view taken on the line 2—2 of Fig. 1, the spring being omitted.

Fig. 3 shows a vertical, sectional view of a modified form of my device; and

Fig. 4 shows a vertical, sectional view of the same taken at right-angles to the view shown in Fig. 3.

In the accompanying drawings I have used the reference numeral 10 to indicate generally the floor forming part of the frame of the body of a motor vehicle. Supported in the frame 10 is a two-part socket comprising the members 11 and 12. Mounted for universal movement in the socket, comprised of the members 11 and 12, is a ball 13. It will thus be seen that there is thus provided an ordinary ball and socket joint.

On the ball is the ordinary actuating arm 14. Supported on the upper portion of the ball, for free universal movement thereon, is a casing 15, the lower portion of which is received between the upper socket member 11 and the ball 13. Connected with the casing 15 is a controlling lever 16, having at its upper end a ball-shaped handle 17. The lever 16 comprises a hollow or tubular member.

Slidably mounted in the lower portion of the lever 16 is a rod 18 having on its lower end a plunger 19 adapted in one of its positions to be received in a recess 20 in the upper portion of the ball 13. In another of its positions the plunger 19 may be withdrawn entirely from the recess 20.

Slidably mounted in the upper portion of the lever 16 is another rod 21. In the upper portion of the rod 18 is a longitudinally, elongated slot 22, in which travels a pin 23 secured to the rod 21. The rod 21 at its lower end preferably is provided with a recess 24 to slidably receive the upper end of the rod 18, and the rod 18 is preferably provided at its upper end with a recess 25 to slidably receive the lower end of the rod 21.

On the rod 21 spaced above its lower end is a collar 26. On the rod 18 spaced below its upper end is a collar or limiting device 27. Mounted on the rods 21 and 18, between the collars 26 and 27 is a coil spring 28, which tends to yieldingly, normally hold the rods 18 and 21 at their extended positions with relation to each other.

Mounted in the handle 17 is a suitable lock. In the drawings herewith shown, I have illustrated an ordinary escutcheon 29 having a hole in which is mounted a plug 30, having a key-hole slot to receive a key 31.

The rod 21 is pivoted to a link 21ª which in turn is pivoted to the plug 30.

It will be seen that in one position of the locking mechanism, the rod 21 will be drawn upwardly for withdrawing the plunger 19 from the recess 20 and the ball 13. When the parts are in the position just mentioned, the lever 16 will be operatively disconnected with the ball 13 and the actuating arm 14, and any effort to control the gear shift mechanism, or to shift the gears would be unavailing. The lever could be merely moved, but it would have no effect on the actuating arm 14.

When it is desired to operatively connect the lever 16 with the ball 13, the key 31 is rotated in the lock until the rod 21 is moved to its downward limit of movement. If, when this movement occurs, the plunger 19 is in registration with the hole 20, then the plunger 19 will drop into the hole or recess 20, being pressed toward such position by the spring 28. If, however, when the rod 21 is moved downwardly by the operation of the key, the plunger 19 should engage some portion of the ball 13, other than in proper registration with the recess 20, the operator can bring the handle of the lever 16 about until he brings the plunger 19 to position where it registers with the recess 20, whereupon the plunger will enter the recess, and the parts will be properly locked together.

It will be noticed that if anything should happen to the lock, when the key is not inserted therein, the spring 28 will always tend to hold the plunger 19 in locking position. That is to say, if anything should happen to the locking mechanism when the parts are locked together, the spring will always hold them in their locked position, and they will not accidentally move to inoperative position.

It will be seen that with my improved lock, the gear shift lever may be released from operative connection with the actuating arm 14 and it will then not be possible to run an automobile.

In Figs. 3 and 4 I have shown another form in which my invention may be embodied. In the form shown in Figs. 3 and 4 I have used the ball 13, casing 15, and lever 16, as already described.

Slidably received within the casing 16 is a plunger 40 longer than the plunger 19, and having a relatively deep recess 41 in its upper end.

The walls of the upper end of the plunger 40 have opposite, longitudinally elongated slots 42.

In place of the rod 21 I have used, in the form of the invention shown in Figs. 3 and 4, a rod 43 which may be connected with the key operated lock the same as the rod 22.

Received in the lower end of the slots 42 is a pin 44, the ends of which project into the slots 42. Received in the recess 41 is a coil spring 45, which yieldingly holds the rods 43 and 40 in their extended positions.

In the form of my invention shown in Figs. 3 and 4, it will be seen that the plunger 40 will enter the recess 20 in the ball 13 for locking the lever to the ball.

When the key is operated for drawing the rod 43 and plunger 40 away from the ball, the plunger will be withdrawn from the ball, and the lever will be inoperative.

The operation of the form of the device now under consideration is substantially the same as that already described.

I do not desire to limit myself to the structure shown herein in its details, but intend to cover by my claims any modified forms of such structure or any mechanical equivalents thereof which may be reasonably included within the scope of such claims.

I claim as my invention:

1. In a device of the class described, a socket joint, a ball and a casing mounted in said joint for movement within the joint and upon each other, an arm connected with said ball, a lever connected with said casing, a locking device adapted to hold the casing from movement relative to the ball when the latter is in a pre-determined position relative to the former for permitting operation of said arm by movement of said lever, and means for rendering said locking device inoperative.

2. In a device of the class described; the combination of a ball mounted in a socket joint; an actuating member operatively connected with said ball; a casing loosely mounted on a portion of said ball; a lever connected with said casing; a plunger mounted in said lever, said ball having a recess for receiving said plunger when said lever is in one position of its movement; and a locking device for controlling the movement of said plunger.

3. In a device of the class described; the combination of a frame with a socket supported thereon; a ball mounted in said socket; an actuating member operatively connected with said ball; a casing supported on said ball for movement with relation thereto; a lever connected with said casing; a plunger slidably mounted in said lever, said ball having a recess for receiving said plunger when the lever is in one of its positions with relation to the ball; yielding means tending to hold said plunger in one of its positions; and a locking device for controlling the movement of said plunger.

4. In a device of the class described; the combination of a frame with a socket supported thereon; a ball mounted in said socket; an actuating member operatively connected with said ball; a casing supported on said ball for movement with relation thereto; a lever connected with said casing; a plunger slidably mounted in said lever, said ball having a recess for receiving said plunger when the lever is in one of its positions with relation to the ball; yielding means tending to hold said plunger in one of its positions; a locking device for controlling the movement of said plunger; said locking device being adapted for locking the plunger in said recess, or in position out of said recess.

5. In a device of the class described, a frame having a socket supported thereon, a ball and a casing mounted for movement within said socket and upon each other, a lever connected with said casing, a plunger slidably mounted therein, means for yieldingly holding the plunger at one limit of its movement, means for locking the plunger at the opposite limit of its movement and means adapted to coact with the plunger when it is at the first described limit of its movement to hold the casing from movement relative to the ball.

6. In a device of the class described, a pair of lever members, each being mounted for universal movement, a locking device adapted in one position to lock said lever members together, and in another position to permit free movement with relation to each other.

Des Moines, Iowa, May 5, 1919.

CLAUDE E. MENTZER.